Aug. 16, 1927.
W. L. ADAMS
1,639,362
LINE GUIDE MECHANISM FOR FISHING REELS
Filed June 26, 1924
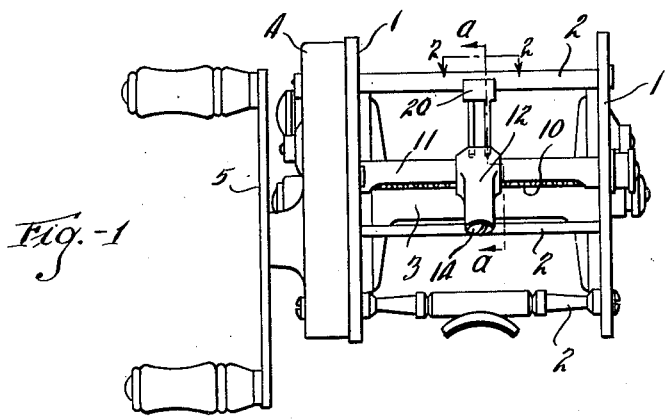
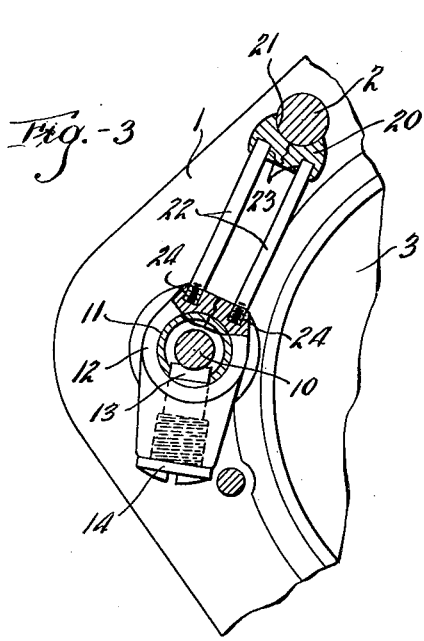
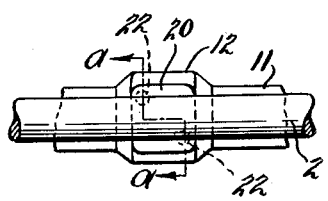
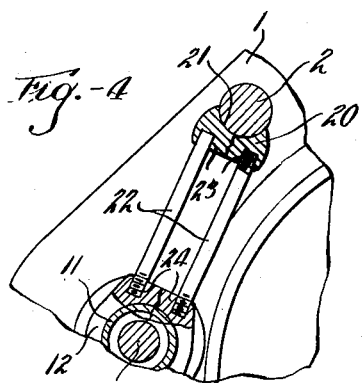
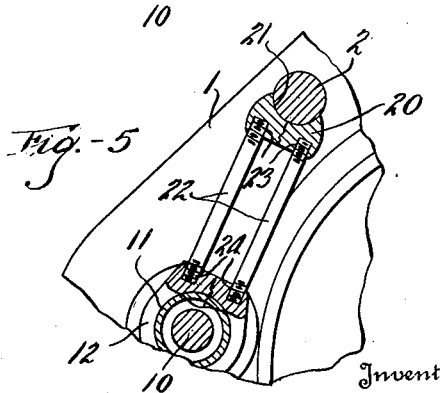
Inventor
Walter L. Adams
By Brockett, Hyde & Milburn
Attorneys Patented Aug. 16, 1927.

1,639,362

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

LINE-GUIDE MECHANISM FOR FISHING REELS.

Application filed June 26, 1924. Serial No. 722,522.

This invention relates to improvements in fishing reels and more particularly, in the level wind mechanism thereof.

The line guiding means of the level wind mechanism usually comprises at least three parts, namely a grooved block which embraces and slides along a pillar connecting the reel end heads and two elongated, substantially parallel plate members connecting and secured to said block and a carriage travelling between the end heads, said plate members being suitably spaced apart to provide a passageway for the fishing line. The plate members heretofore have been connected to the grooved block and the travelling carriage by a soldering or brazing process, which not only makes this part of the level wind mechanism more or less costly but also unsatisfactory due to the fact that these connecting plate members frequently become loose or detached from the block, the carriage, or both.

The object of the present invention is to improve the construction of the line guiding means of the level wind mechanism by the provision of simple pins for the connecting members, which pins seat in suitable openings in the travelling carriage and the pillar engaging block, the several openings being either tapped or plain, as desired. The construction of the line guiding means is, therefore, not only simplified and improved but the cost of manufacture of this part of the reel is reduced. Moreover, there is no liability of the connecting pins becoming detached from the carriage or the pillar engaging block, such as might occur with soldered or brazed connections.

In the drawing, Fig. 1 is a front elevation of a fishing reel embodying my invention; Fig. 2 is a detail plan view on the line 2—2, Fig. 1; Fig. 3 is a detail sectional view in the plane of the line a—a, Figs. 1 and 2; Fig. 4 is a similar view but showing one of the openings of the pillar engaging block tapped; and Fig. 5 is a similar view with both of the openings of said block tapped.

The reel shown in the drawing includes the usual end plates or heads 1 connected by pillars 2 and between which end heads rotates a spool 3 upon which the fishing line is adapted to be wound. The spool is operated by suitable gearing in the gear casing 4 attached to one end head the gears being actuated by the operating handle 5.

The level wind mechanism includes a reversely threaded shaft 10 rotatable by the gearing in casing 4 and enclosed within a slotted protecting tube 11, the tube and shaft being endwise removable through an opening in that end head to which the gear casing is not attached. Sleeved and sliding upon said protecting tube 11 is a carriage 12 within which is a pawl 13 engaging the threaded shaft 10 through the slot in said protecting tube, said pawl being held within said carriage in engagement with said shaft by a threaded plug 14.

The line guiding means forming the subject matter of the present invention comprises a block 20 provided with a recess 21 to receive one of the pillars connecting the end heads, along which pillar it is adapted to slide. Said block is mounted upon the end portions of two spaced substantially parallel pins 22 which seat in suitable openings 23 in the pillar engaging block and in suitable openings 24 in the carriage. Preferably, said pins are arranged in an askew or inclined position relative to the carriage axis, as clearly shown in Fig. 2. These pins are preferably made of stainless steel which resists wear and is capable of more rigid securement than other materials formerly used.

In the form shown in Fig. 3, the openings 24 of the carriage are tapped to receive the threaded lower end portions of the pins. The openings of the pillar engaging block and the upper end portions of the pins are, however, plain or unthreaded. In the form shown in Fig. 4, one of the openings of the pillar engaging block is tapped to receive the threaded upper end portion of one of the pins, the other block opening and the upper end portion of the other pin being plain. In the form shown in Fig. 5, both of the openings of the pillar engaging block are tapped to receive the threaded upper end portions of the pins, so that all four pin openings are tapped. In this form, the threads at one end of each pin are right-hand threads while the threads at the other end are left-hand threads, the threads of the tapped openings being of a corresponding nature. While I have shown the openings of the carriage tapped and the lower end portions of the pins threaded in all three forms, it will be understood that these openings may be plain or only one thereof tapped, one, both or neither of the openings of the pillar engaging block being tapped.

It will thus be seen that I have provided line guiding means of simple construction, of strong and durable character, and which is inexpensive to manufacture.

What I claim is:

1. In a fishing reel, spaced end heads, a pillar connecting the same, a spool rotatable between said end heads, a carriage movable back and forth between said end heads and provided with a pair of spaced openings, a block engaging the pillar connecting said end heads and provided with a pair of spaced openings, and a pair of rods having their end portions engaging in the openings of said travelling carriage and said pillar engaging block, the space between said rods and said carriage and said block providing a confined passageway for the fishing line.

2. In a fishing reel, spaced end heads, a pillar connecting the same, a spool rotatable between said end heads, a carriage movable back and forth between said end heads and provided with a pair of spaced openings, a block engaging the pillar connecting said end heads and provided with a pair of spaced openings, and a pair of rods having their end portions engaging in the openings of said travelling carriage and said pillar engaging block, one of said openings and the end portions of the rod engaging therein having threaded connections, the space between said rods and said carriage and said block providing a confined passageway for the fishing line.

3. In a fishing reel, spaced end heads, a pillar connecting the same, a spool rotatable between said end heads, a carriage movable back and forth between said end heads and provided with a pair of spaced openings, a block engaging the pillar connecting said end heads and provided with a pair of spaced openings, and a pair of rods having their end portions engaging in the openings of said travelling carriage and said pillar engaging block, one of the openings of the carriage and the rod end portion engaging therein and one of the pillar engaging block openings and the rod end portion engaging therein having threaded connection, the space between said pins and said carriage and said block providing a confined passageway for the fishing line.

4. In a fishing reel, spaced end heads, a pillar connecting the same, a spool rotatable between said end heads, a carriage movable back and forth between said end heads and provided with a pair of spaced openings, a block engaging the pillar connecting said end heads and provided with a pair of spaced openings, and a pair of rods having their end portions engaging in the openings of said travelling carriage and said pillar engaging block, the openings of said carriage and the rod end portions engaging therein having threaded connection.

5. In a fishing reel, spaced end heads, a pillar connecting the same, a spool rotatable between said end heads, a carriage movable back and forth between said end heads and provided with a pair of spaced openings, a block engaging the pillar connecting said end heads and provided with a pair of spaced openings, and a pair of rods having their end portions engaging in the openings of said travelling carriage and said pillar engaging block, the openings for one of said engaging block, the openings for one of said rods being tapped to receive the threaded end portions thereof, the threads of one opening and rod end portions being left hand threads while the threads of the other opening and rod end portion are right hand threads.

6. In a fishing reel, spaced end heads, a pillar connecting the same, a spool rotatable between said end heads, a carriage movable back and forth between said end heads and provided with a threaded opening, a member engaging said connecting pillar and also provided with a threaded opening, and line guiding means provided with integral threaded end portions secured in the threaded openings of said carriage and said pillar engaging member.

7. In a fishing reel, spaced end heads, a pillar connecting the same, a spool rotatable between said end heads, a carriage movable back and forth between said end heads and provided with an opening, a member engaging said pillar and also provided with an opening, and line guiding means provided with integral end portions engaging in the openings of said carriage and said pillar engaging members, one of said openings being threaded to receive the threaded end portion of the line guiding means engaging therein.

In testimony whereof I hereby affix my signature.

WALTER L. ADAMS.